(12) United States Patent
Cannon

(10) Patent No.: US 10,933,789 B2
(45) Date of Patent: Mar. 2, 2021

(54) LOW BED HIGH DUMP TRAILER

(71) Applicant: Lester G. Cannon, Abbeville, SC (US)

(72) Inventor: Lester G. Cannon, Abbeville, SC (US)

( * ) Notice: Subject to any disclaimer, the term of this patent is extended or adjusted under 35 U.S.C. 154(b) by 0 days.

(21) Appl. No.: 16/266,233

(22) Filed: Feb. 4, 2019

(65) Prior Publication Data
US 2019/0248266 A1    Aug. 15, 2019

Related U.S. Application Data

(60) Provisional application No. 62/630,291, filed on Feb. 14, 2018.

(51) Int. Cl.
| | |
|---|---|
| *B60P 1/16* | (2006.01) |
| *B60P 1/267* | (2006.01) |
| *B62D 53/06* | (2006.01) |

(52) U.S. Cl.
CPC ............... *B60P 1/16* (2013.01); *B60P 1/267* (2013.01); *B62D 53/062* (2013.01)

(58) Field of Classification Search
CPC .. B60P 1/16; B60P 1/267; B60P 1/435; B60P 1/28; B62D 55/062
USPC ............................ 298/5, 6, 17 R, 22 R, 22 P
See application file for complete search history.

(56) References Cited

U.S. PATENT DOCUMENTS

| | | | | |
|---|---|---|---|---|
| 2,507,169 A | * | 5/1950 | Lundell | B60P 1/16 298/22 B |
| 3,550,801 A | * | 12/1970 | Larson | B60P 3/064 414/480 |
| 5,544,944 A | * | 8/1996 | Keech | B60P 1/24 298/5 |
| 2014/0234060 A1 | * | 8/2014 | Penner | B60P 1/16 414/477 |
| 2019/0337437 A1 | * | 11/2019 | Cusack | B60P 1/283 |

* cited by examiner

*Primary Examiner* — Stephen T Gordon
(74) *Attorney, Agent, or Firm* — Hammer & Associates, P.C.

(57) ABSTRACT

A multi-purpose trailer includes: a trailer frame with a tongue or a gooseneck located at a forward end of the trailer frame and an axle with wheels located adjacent a rearward end of the trailer frame; a pair of slanted arms affixed adjacent the rearward end of the trailer frame; a box pivotally mounted to a distal end of each slanted arm, the box having an upper structural frame and a slanted tailgate; and a pair of movement arms with one end of each movement arm pivotally affixed to the trailer frame and/or adjacent the slanted arm and another end of each movement arm pivotally affixed to the upper structural frame of the box, the movement arms move the box between a load position and a dump position.

11 Claims, 5 Drawing Sheets

LOW BED HIGH DUMP TRAILER

RELATED APPLICATION

This application claims the benefit of U.S. Provisional Patent Application Ser. No. 62/630,291 filed Feb. 14, 2018, incorporated herein by reference.

FIELD OF THE INVENTION

The instant invention is directed to low bed, high dump trailer.

BACKGROUND OF THE INVENTION

There is a need, in at least the construction or farming industries, for a multi-purpose trailer that may allow a single individual to take equipment (e.g., a skid-steer loader or tractor) to a site and provide a container for removal of material (e.g., debris) from that site.

DESCRIPTION OF THE DRAWINGS

For the purpose of illustrating the invention, there is shown in the drawings a form that is presently preferred; it being understood, however, that this invention is not limited to the precise arrangements and instrumentalities shown.

SUMMARY OF THE INVENTION

A multi-purpose trailer includes: a trailer frame with a gooseneck or a tongue located at a forward end of the trailer frame and an axle with wheels located adjacent a rearward end of the trailer frame; a pair of slanted arms affixed adjacent the rearward end of the trailer frame; a box pivotally mounted to a distal end of each slanted arm, the box having an upper structural frame and a slanted tailgate; and a pair of movement arms with one end of each movement arm pivotally affixed to the trailer frame and/or adjacent the slanted arm and another end of each movement arm pivotally affixed to the upper structural frame of the box, the movement arms move the box between a load position and a dump position.

DESCRIPTION OF THE INVENTION

Figure 1:
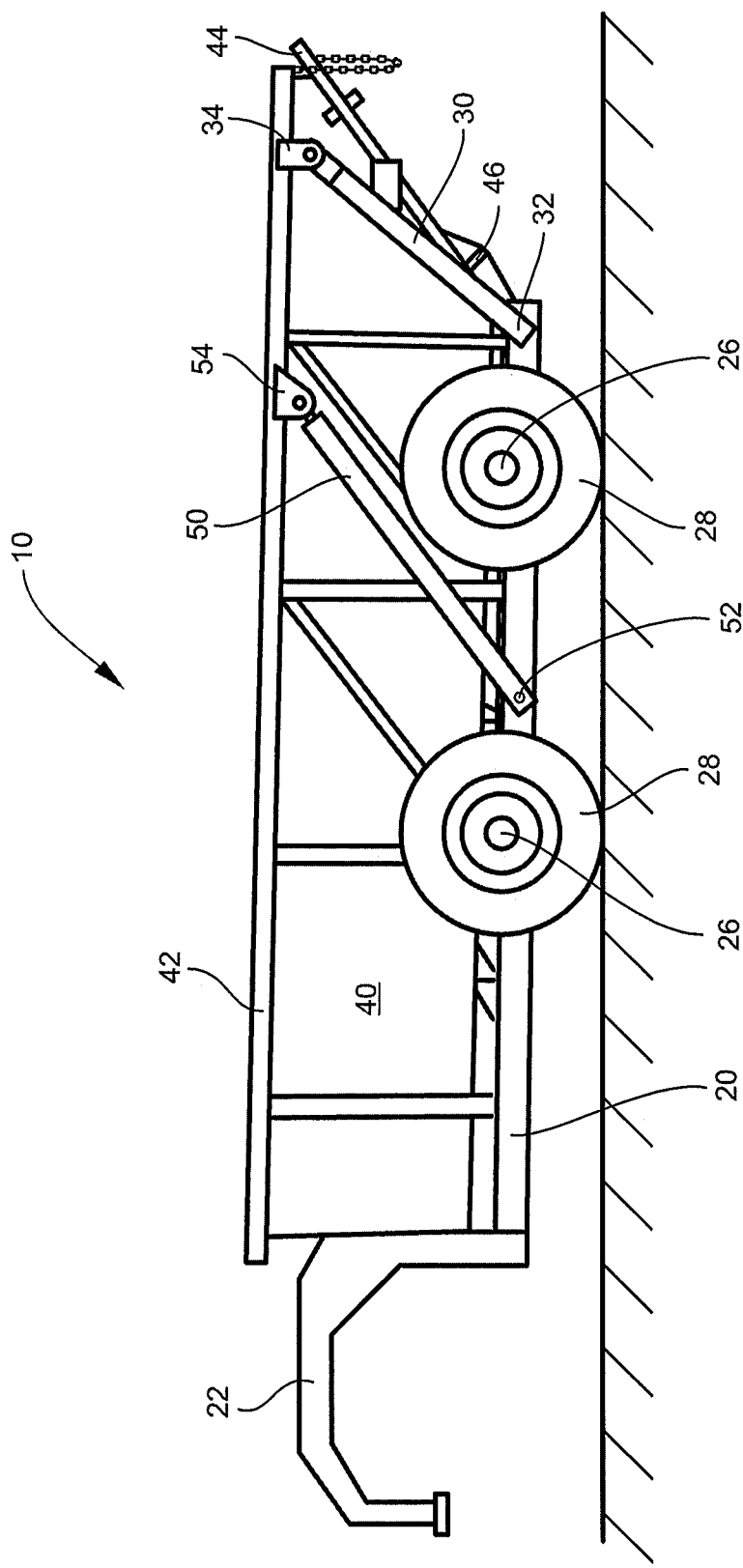
FIG. 1 is an elevational view of an embodiment of the inventive trailer with a box in a down (or loading) position.
Figure 2:
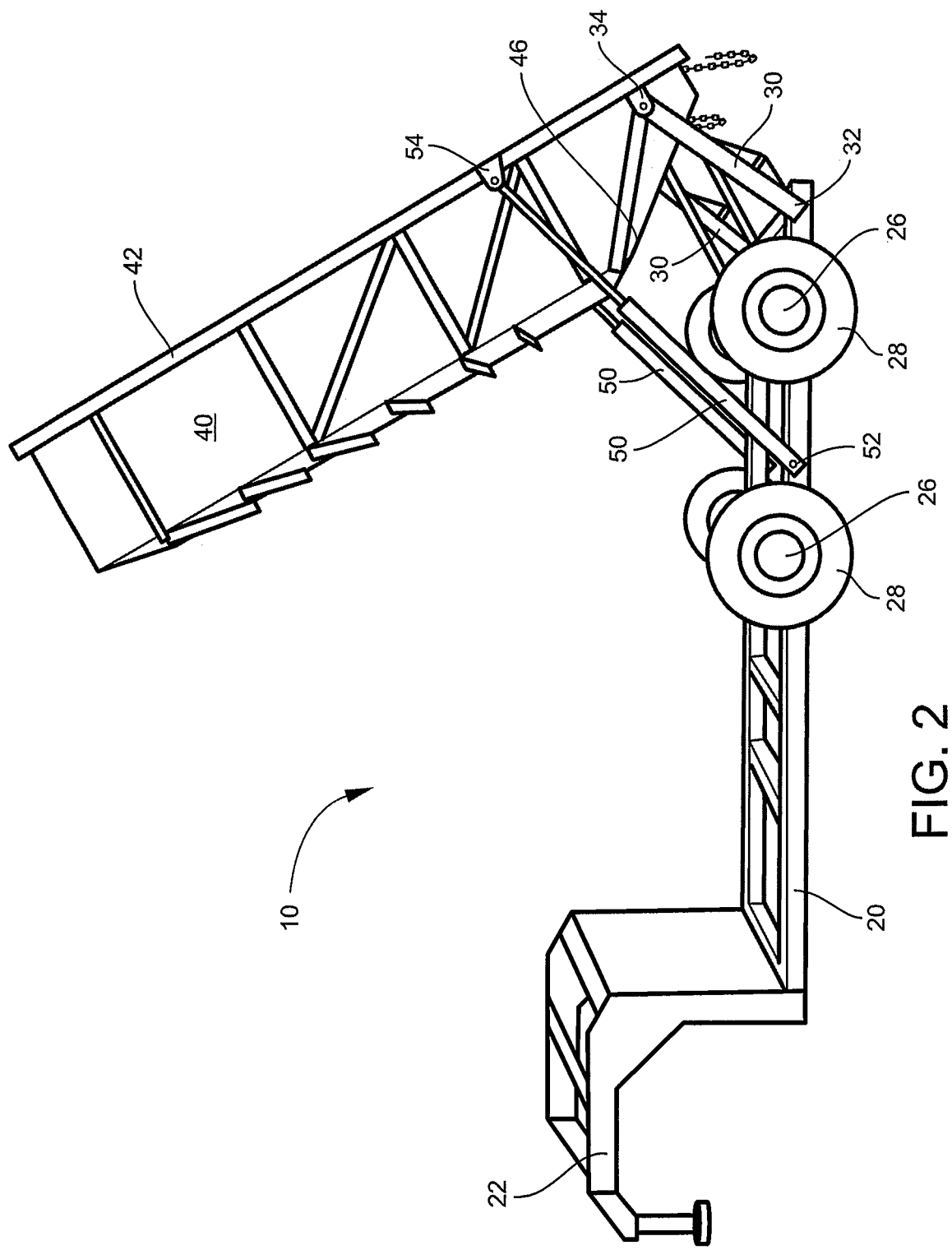
FIG. 2 is another view of the embodiment of FIG. 1 with the box partially raised.
Figure 3:
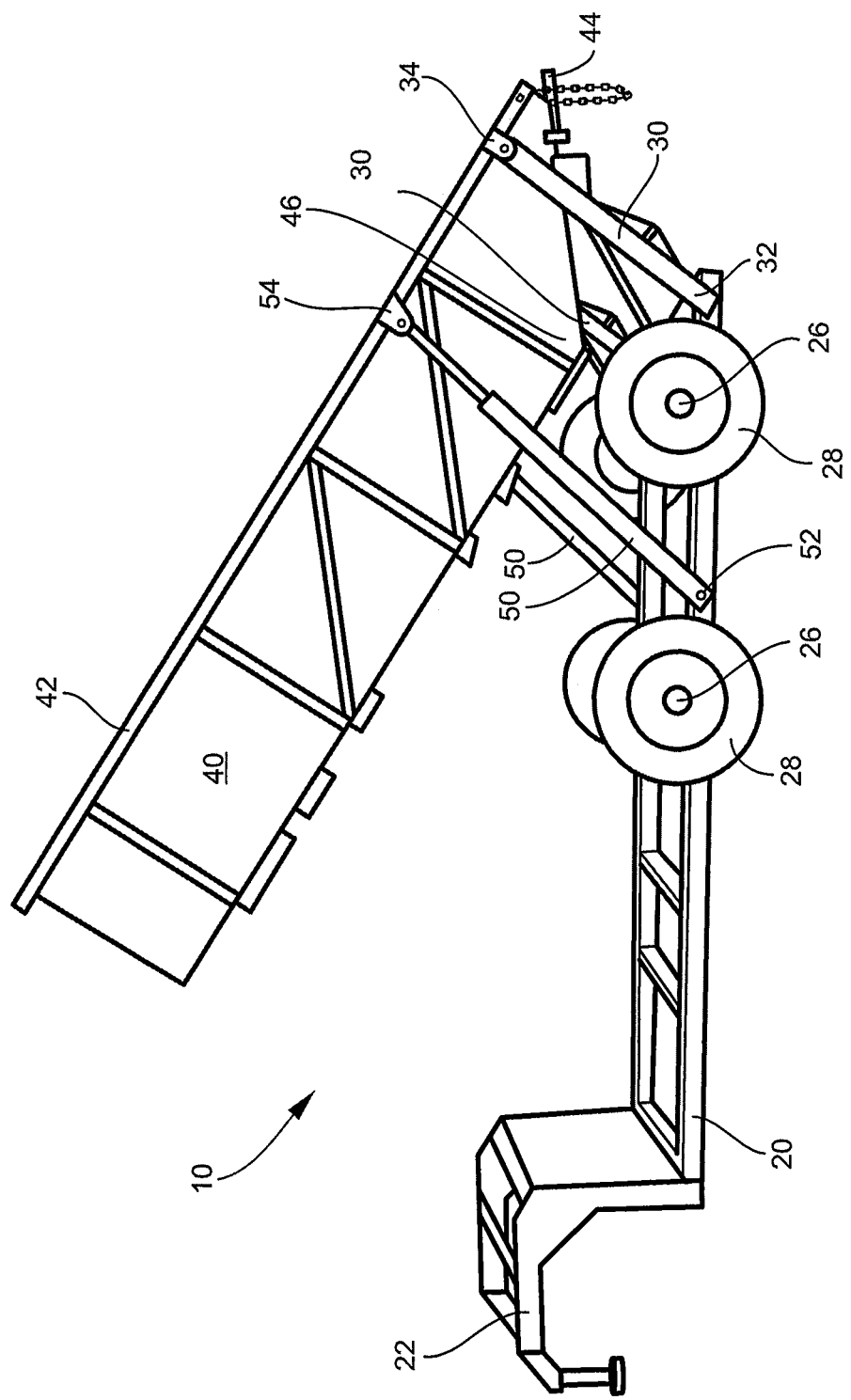
FIG. 3 is yet another view of the embodiment of FIG. 1 with the box fully raised (i.e., in the dump position).
Figure 4:
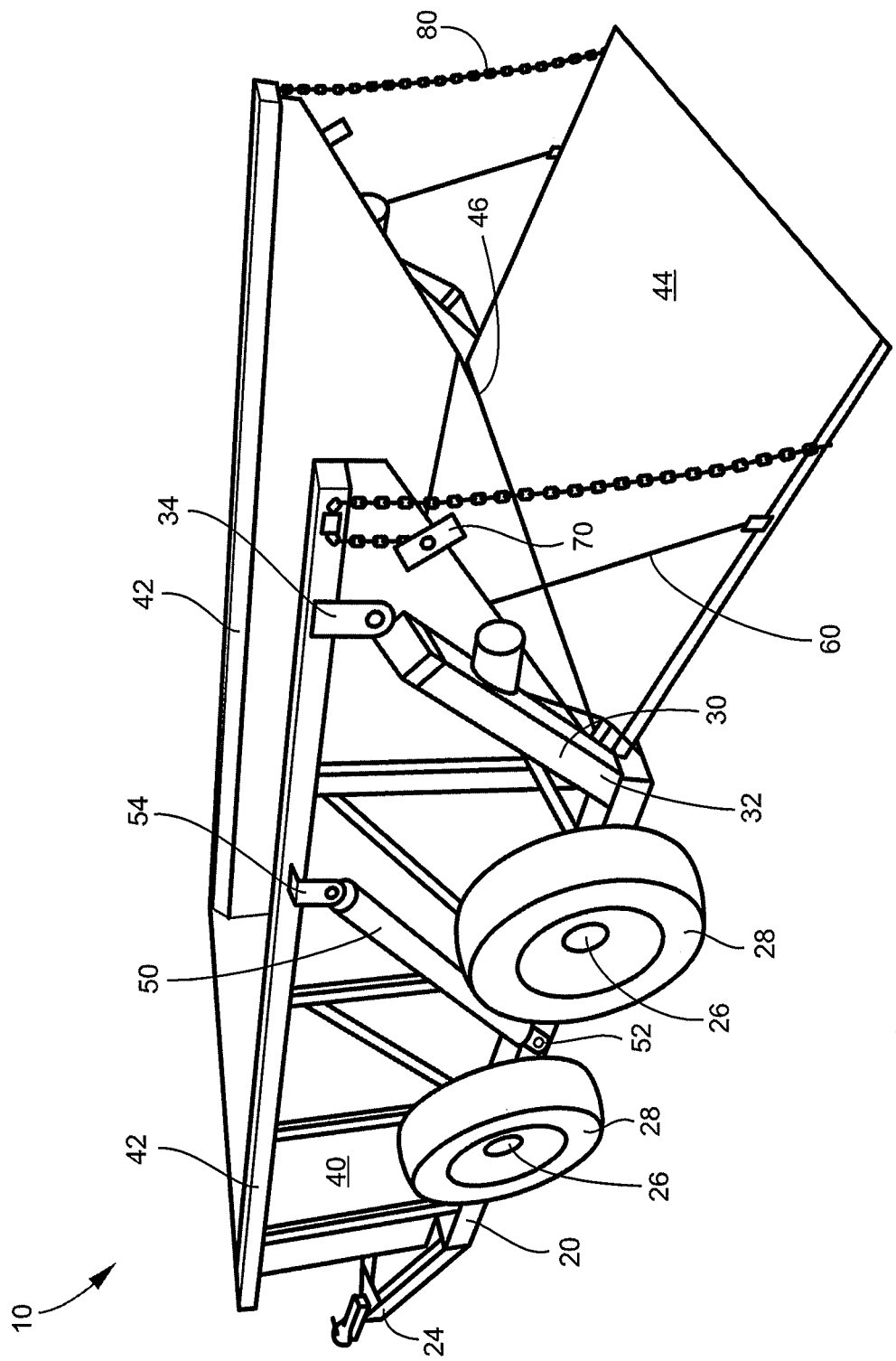
FIG. 4 is still another view of the embodiment of the FIG. 2 showing the tailgate in the open (or down) position.

Referring to drawing were like numerals indicate like elements, there is shown, in FIGS. 1-4, an embodiment of the inventive trailer 10. FIG. 1 illustrates a box of the trailer in a load (or down) position, FIG. 2 illustrates the box in a position midway between the load and dump positions, FIG. 3 illustrates the box in the dump position, and FIG. 4 illustrates a tailgate of the box in a down position.

The trailer 10 may be a 'lowboy' trailer (illustrated). In one embodiment, the trailer 10 may be haul loads up to 8000 pounds. Such a load may include: skid steer loader, tractor, debris, etc.

Figure 5:
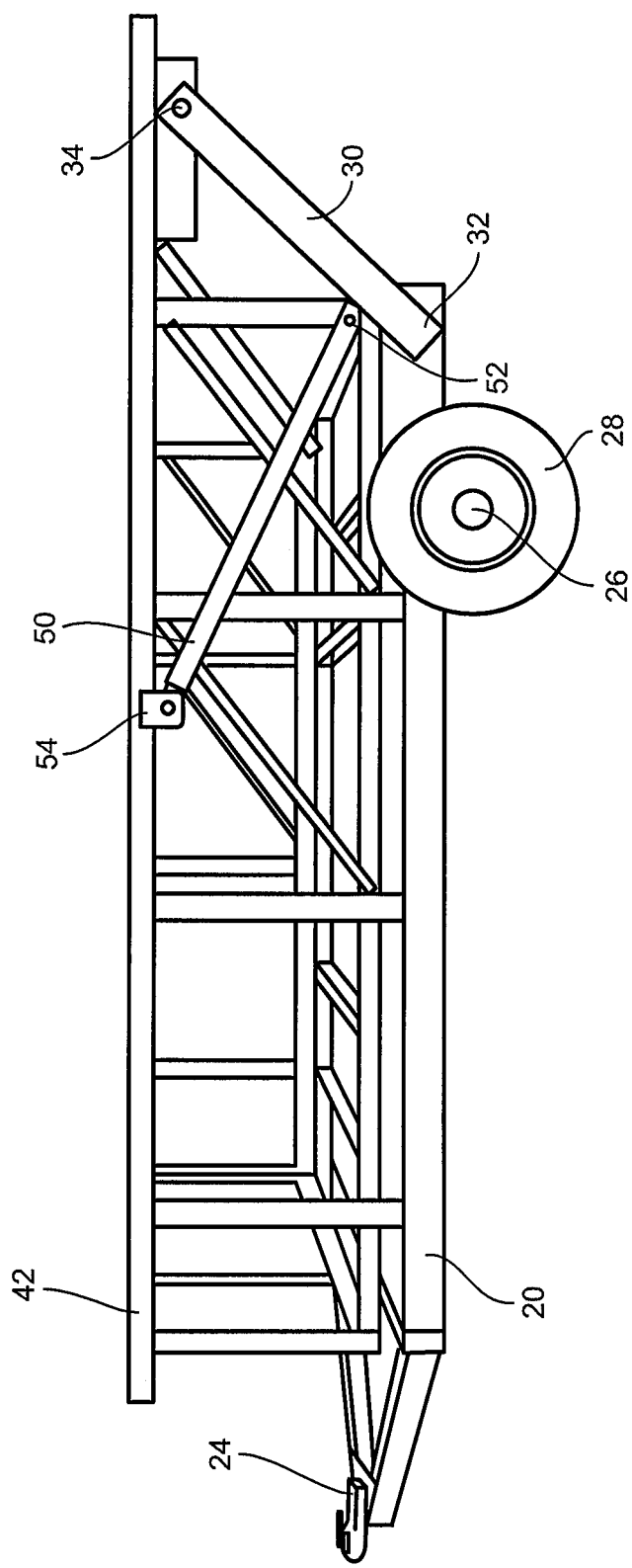
FIG. 5 is an elevation view of another embodiment of the inventive trailer, showing structural frame of the box but not showing the box sides or tailgate.

The trailer 10 generally includes: a trailer frame 20 with a gooseneck 22 (see FIG. 1-3) or tongue 24 (see FIG. 5) located at a forward end of the trailer frame 20 and, at least, one axle 26 with wheels 28 (compare FIGS. 1 and 5) located adjacent a rearward end of the trailer frame 20; a pair of slanted arms 30 affixed adjacent the rearward end of the trailer frame; a box 40 pivotally mounted to a distal end of each slanted arm 30, the box 40 having an box (or upper structural) frame 42 and a slanted tailgate 44; and a pair of movement arms 50 with one end of each movement arm pivotally affixed to the trailer frame 20 and/or adjacent the slanted arm 30 and another end of each movement arm 50 pivotally affixed to the upper structural frame 42 of the box 40, the movement arms 50 move the box 40 between a load position, see FIGS. 1 and 5 and a dump position, see FIG. 3.

The trailer frame 20 is adapted to be removably affixed to a vehicle (not shown) via the gooseneck 22 or tongue 24. The gooseneck 22 or tongue 24 may include a conventional trailer support device, e.g., a tongue jack (not shown), to support the forward end of the trailer when not affixed to the vehicle. The trailer frame 20 is made of structural material (e.g., steel) sufficient to safely carry the weight of the trailer load.

Slanted arms 30 (pair) are affixed to the rearward end of the trailer frame 20. The slanted arms 30 are affixed 32 at an angle to the trailer frame. In one embodiment, the angle may be 40°, but may range between 30°-70°, or 40°-60°. The slanted arms are made of structural material (e.g., steel) sufficient to carry the weight of the trailer load.

The box 40 is an opened top container with a box (or upper structural) frame 42 and a slanted tailgate 44. The box 40 may be co-extensive with the trailer frame 20 (as shown, for example, in FIG. 1). The structural frame 42 is affixed along, at least, a portion of the opened top box 40. The structural frame 42 may be affixed to the peripheral edge of the opened top box 40, except for the tailgate 44. The structural frame 42 may be affixed to the entire peripheral edge of the opened top box 40, including the tailgate 44.

The slanted tailgate 44 is adapted for off-loading (or discharging) the contents of the box 40, when the box 40 is in the dump position (see FIG. 3), or is adapted to be used as a ramp for loading equipment, when the box 40 is in the level position (see FIG. 4). The tailgate 44 is pivotally affixed 46 to the box and may be moved between an upright (or closed) position and ramp (or opened) position. The tailgate 44 may be locked in the upright (or closed) position in any conventional fashion. The tailgate 44 may be at an angle to a floor of the box 40 which in the load position is generally parallel with the trailer frame 20. In one embodiment, the angle may be 50°, but may range between 35°-55°, or 40°-50°. The box 40, structural frame 42, and tailgate 44 are made of structural material (eg, steel) sufficient to safely carry the weight of the trailer load. In general, the tailgate angle is greater than the angle of the slanted arms.

The box 40 is pivotally joined 34 at the upper end of the slanted arms 30 for movement between the load position (FIG. 1) and the dump position (FIG. 3).

In the load position (FIG. 1), the box 40 is essentially horizontal. In the dump position, the box 40 is nearly vertical (i.e., nearly 90°). In one embodiment, the dump position of the box 40 may be at an angle in the range of about 70° to less than 90°. In another embodiment, the dump position of the box 40 may be at an angle in the range of about 75° to 85°. In yet another embodiment, the dump position of the box 40 may be at an angle in of about 80°.

The movement arms 50 may be any device capable of moving the box 40 between the load position and the dump position. In one embodiment, the movement arms 50 may be hydraulically driven. The hydraulic actuators (i.e., hydraulic pump) may be located on the trailer. The movement arms 50 are pivotally connected at their lower ends to the trailer frame 20 (e.g., see FIG. 1), and/or adjacent the slanted arms 30, see FIG. 5. The movement arms 50 are pivotally connected at their upper ends to the box frame 42. Extension of the movement arms 50 moves the box 40 upward, and retraction of the movement arms 50 moves the box 40 downward.

The trailer 10 may be equipped with running lights and safety connections as required by law or dictated for safe operation. Additionally, the tailgate 44 may include: a tailgate assist mechanism 60, a tailgate latch 70, and tailgate safety chain 80, see FIG. 4. The tailgate assist mechanism 60 may be any mechanism that facilitates the opening and closing of the tailgate, such as, but not limited to, a counterweight system and/or a spring system. The tailgate latch 70 may be any such mechanism, such as, but not limited to, a spring-loaded latch or a non-spring-loaded latch.

In operation, the box 40 of the trailer 10 may be loaded with equipment via the tailgate 44 in the ramp position and taken to a construction site where the equipment is offloaded from the box 40 via the tailgate 44 in the ramp position. The box 40 may be loaded (while in the load position and the tailgate 44 in the closed position) with construction debris. Then, the trailer may be taken to a dump where the debris is off loaded (discharged) by raising the box to the dump position.

The present invention may be embodied in other forms without departing from the spirit and the essential attributes thereof, and, accordingly, reference should be made to the appended claims, rather than to the foregoing specification, as indicated the scope of the invention.

I claim:

1. A multi-purpose trailer comprises:
    a trailer frame with a tongue or a gooseneck located at a forward end of the trailer frame and an axle with wheels located adjacent a rearward end of the trailer frame;
    a pair of slanted arms affixed adjacent the rearward end of the trailer frame;
    a box pivotally mounted to a distal end of each slanted arm, the box having an upper structural frame and a slanted tailgate; and
    a pair of movement arms with one end of each movement arm pivotally affixed to the trailer frame and/or adjacent a respective one of the slanted arms and another end of each movement arm pivotally affixed to the upper structural frame of the box, the movement arms move the box between a load position and a dump position.

2. The multi-purpose trailer of claim 1 wherein the trailer is a lowboy trailer.

3. The multi-purpose trailer of claim 1 wherein the slanted arms are fixed to the trailer frame at an angle between about 35°-60°.

4. The multi-purpose trailer of claim 3 wherein the angle is between about 40°-55°.

5. The multi-purpose trailer of claim 3 wherein the angle is about 40°.

6. The multi-purpose trailer of claim 1 wherein the movement arms are hydraulically actuated.

7. The multi-purpose trailer of claim 1 wherein the box is an opened top vessel.

8. The multi-purpose trailer of claim 1 wherein the tailgate moves between a closed position and a ramp position.

9. The multi-purpose trailer of claim 1 wherein the box is co-extensive with the trailer frame.

10. The multi-purpose trailer of claim 1 wherein the slanted tailgate is adapted to off load any materials contained in the box when the box is in the dump position and to load equipment into the box, when the box is in the load position.

11. A multi-purpose trailer comprises:
    a trailer frame with a tow feature located at a forward end of the trailer frame and an axle with wheels located adjacent a rearward end of the trailer frame, the trailer frame is a low-boy frame;
    a pair of slanted arms affixed adjacent the rearward end of the trailer frame, the slanted arms are fixed to the trailer frame at an angle between about 40°-55°;
    a box pivotally mounted to a distal end of each slanted arm, the box having an upper structural frame and a slanted tailgate, the box is an opened top vessel, the box is co-extensive with the trailer frame, the tailgate moves between a closed position and a ramp position; and
    a pair of hydraulically actuated movement arms with one end of each movement arm pivotally affixed to the trailer frame and/or adjacent a respective one of the slanted arms and another end of each movement arm pivotally affixed to the upper structural frame of the box, the movement arms move the box between a load position and a dump position, wherein the slanted tailgate is adapted to off load any materials contained in the box when the box is in the dump position and to load equipment into the box, when the box is in the load position.

* * * * *